United States Patent [19]

Fujiwara

[11] 3,796,227

[45] Mar. 12, 1974

[54] AIR VENT

[76] Inventor: Katsuji Fujiwara, 191, Nishitani, Hiraoka-cho, Kakogawa-shi, Hyago-ken, Japan

[22] Filed: Aug. 23, 1972

[21] Appl. No.: 283,041

[30] Foreign Application Priority Data
Aug. 27, 1971 Japan.............................. 46/77627

[52] U.S. Cl................................. 137/202, 137/390
[51] Int. Cl....................... F16k 45/02, F16k 31/18
[58] Field of Search............................ 137/202, 390

[56] References Cited
UNITED STATES PATENTS

| | | | |
|---|---|---|---|
| 3,324,874 | 6/1967 | Armstrong.......................... | 137/202 |
| 2,633,142 | 3/1953 | Woolley.............................. | 137/202 |
| 2,106,512 | 1/1938 | Woolley.............................. | 137/202 |
| 1,040,528 | 10/1912 | Dock.............................. | 137/390 X |
| 2,111,473 | 3/1938 | Hudson.............................. | 137/202 |

*Primary Examiner*—Alan Cohan
*Attorney, Agent, or Firm*—Toren, McGeady and Stanger

[57] ABSTRACT

An air vent is formed of a hollow chamber containing a metal float with a valve member forming the air outlet attached to the exterior of and disposed in communication with the hollow chamber. At the lower end of the hollow chamber an inlet port is located containing a syphon rod. Within the hollow chamber, a connecting member is attached to the float and a lever is loosely fitted into the connecting member and extends outwardly from the hollow chamber into a valve chamber in the valve member. Within the valve chamber a valve holder is fixed to the end of the lever and a valve body, preferably formed of a synthetic rubber, is fitted into the valve holder and is biased against a valve seat so that normally the air outlet is closed. When an excess of air accumulates in the hollow chamber, the float is displaced and it moves the lever causing the valve body to pivot about the valve seat so that the air is discharged from the hollow chamber through the valve member.

7 Claims, 1 Drawing Figure

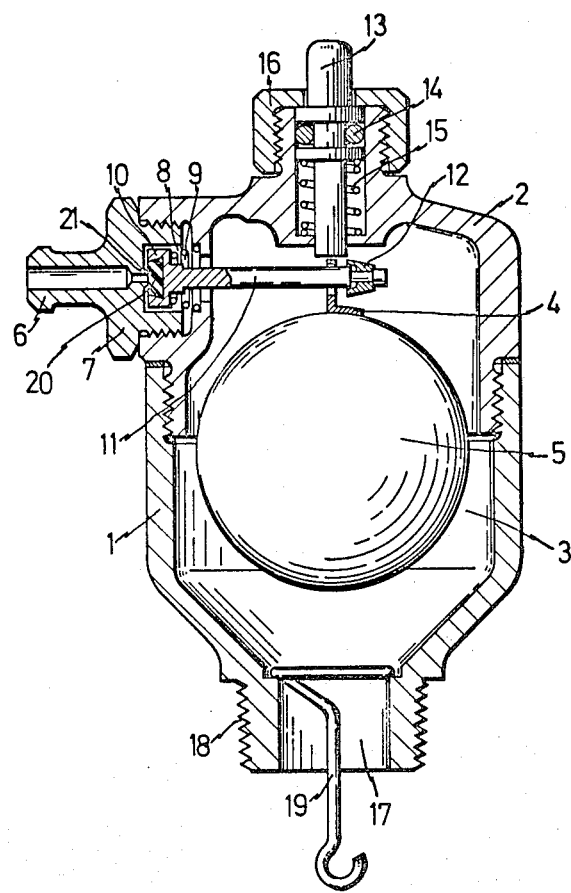

AIR VENT

BACKGROUND OF THE INVENTION

Generally, an air vent is attached to a projecting portion of cold water or hot water piping and the like for automatically venting air which accumulates in the projecting portions.

When an air vent is used as an air vent valve in small sized coolers and heaters, it is particularly important that the air vent itself be small in size and especially in height because of the position in which it must be mounted. Further, the air vent must be available in a wide range of working pressures from zero to 16 Kg/cm$^2$ and without any regulation for use in high-rise buildings. Moreover, the opening and closing action of the air vent must be accurate, free from trouble and have the advantages of low production cost and easy handling.

Usually, such air vent valves have an exhaust port in the top portion and a float or a bucket is positioned within the valve. One end of a lever is directly connected to the float or bucket, its other end is attached to the body of the valve by a pin which serves as a fulcrum. Additionally, a valve member is attached to the lever for effecting the venting action in reaction to the movement of the float or bucket.

In such valves, the pinned attachment of the lever to the main body of the valve results in difficulties in its operation such as wear, rust, and the like at the fulcrum of the lever. Further, the alignment of the valve body with its valve seat is particularly difficult. Therefore, it is very difficult to assure the perfect closing action of the valve and, as a result, leakage develops.

Furthermore, in air vent valves of the above type it is impossible to increase the leverage, so that a larger float is needed and the shape of the entire valve increases and it can not be easily incorporated into a small sized cooler and heater. In addition, due to the small valve outlet, considerable time is required for venting the air at start-up and the available working pressure is very low, such as about 1 Kg/cm$^2$. Another disadvantage is that such valves have limited applications and a very short useful life.

SUMMARY OF THE INVENTION

The present invention is directed to an improvement in air vent valves and, more particularly, it is directed to a novel lever arrangement for air vent valves. Further, by means of this improved air vent valve, the defects and disadvantages mentioned above are eliminated or at least substantially reduced.

In accordance with the present invention, an air vent is formed by a hollow chamber containing a metal float with a connecting member fixed to the upper portion of the float. The hollow chamber is formed of a lower main body and a cover member so that the hollow chamber has a bottom surface, side surfaces and an upper surface. Secured to the exterior of the upper portion of the side surface of the hollow chamber is a valve member which forms a valve chamber in communication with the hollow chamber. The valve member forms a valve seat and a valve body is positioned within the valve chamber and is biased into the closed position against the valve seat by means of a spring. One end of a lever is fixed to the valve body within the valve chamber and it extends into the hollow chamber where it fits into an opening in the connecting member on the float. A stopper is fitted onto the end of the lever which extends through the connecting member to prevent it from becoming disengaged from the float. Extending downwardly into the top of the hollow chamber is a operating valve which can be manually depressed against the float so that the lever is moved downwardly and causes the valve to open for venting air.

The valve member is detachably connected to the hollow chamber so that the valve can be easily inspected and, if necessary, repair or replacement can be readily effected. As distinguished from conventional air vent valves, the lever used for opening and closing the valve is not pin connected to the main body of the valve, rather the lever is connected directly to a valve body so that the valve body pivots relative to the valve seat which acts as a fulcrum. In this improved arrangement the leverage obtained is considerably greater than that available in conventional valves and a valve outlet port of increased size can be opened by a float of relatively small size.

In the present invention, the surface of the valve body contacting the valve seat is planar and since the lever is not fixed and does not require a guide groove for its end, it is unnecessary to align the valve body with the valve seat. As a result, there is no problem with the lever catching and a perfect valve closing action is assured.

Moreover, in the present air vent valve, a syphon rod is provided at an inlet into the lower end of the hollow chamber and its end projects downwardly for facilitating the replacement of water and air within the hollow chamber after venting takes place.

The various features of novelty which characterize the invention are pointed out with particularity in the claims annexed to and forming a part of this disclosure. For a better understanding of the invention, its operating advantages and specific objects attained by its use, reference should be had to the acompanying drawings and descriptive matter in which there are illustrated and described preferred embodiments of the invention.

BRIEF DESCRIPTION OF THE DRAWING

In the drawing a vertical cross-sectional view is shown of an air vent embodying the present invention.

DETAILED DESCRIPTION OF THE INVENTION

As shown in the drawing, an air vent is formed of a lower main body 1 to which an upper cover member 2 is threadedly connected. The main body 1 and the cover member 2 define a hollow chamber 3 having a bottom surface formed by the main body, a side surface formed by the combination of the main body and the cover member and a top surface formed by the cover member. Movably displaceably positioned within the hollow chamber 3 is a metal float 5 having a connecting member 4 attached to its upper or crown portion.

Threadedly connected to the exterior of the upper side surface of the cover membr 2 is a valve member 7 having an outwardly projecting portion 6 which forms the air vent outlet. Due to its threaded connection, the valve member 7 can be easily removed from the cover member 2 and as indicated in the drawing the valve member extends transversely of the direction of movement of the float 5 within the hollow chamber 3. The end of the valve member 7 facing the hollow chamber, forms a valve chamber 8 communicating with the hollow chamber through an opening in the wall of the cover member 2. The valve member 7 forms a valve seat 21 facing into the valve chamber and arranged about the opening into the outlet which extends through the portion 6 of the valve member. Within the valve chamber, a valve holder 10 is arranged in which a valve body 20 is fitted so that the valve body has a planar surface in juxtaposition to the valve seat 21. On the opposite side of the valve holder 10 from the valve seat, a coil spring 9, positioned within the valve chamber, biases the valve holder toward the valve seat 21 so that the valve body 20 contacts the valve seat and effects a closure of the opening into the outlet through the portion 6.

Within the valve chamber 8, one end of a lever 11 is fixed to the valve holder and the lever extends through the opening in the cover member 2 into the upper end of the hollow chamber 3. Within the hollow chamber, the opposite end of the lever extends through an opening in the connecting member 4 located on the crown of the float 5 and the opening through the connecting member is arranged so that, in the closed position of the valve body 20 a clearance is maintained between the lever 11 and the connecting member 4. To prevent the float 5 from being displaced from the lever, a stopper 12 is connected onto the end of the lever located within the hollow chamber.

If the valve body is formed of a synthetic rubber, such as nitrile, an improved air-tight effect is provided between the valve body 20 and the valve seat 21.

Extending through the top of the cover member 2 is an operating rod 13 having its lower end projecting into the hollow chamber 3 directly above and in alignment with the connecting member 4 on the crown of the float 5. Within the top of the cover member an enlarged bore is provided through which the operating rod 13 extends and a spring 15 is positioned within the bore with its lower end in contact with the bottom of the bore and its upper end bearing against a flange on the operating rod. Above the flange an O-ring 14 encircles the rod and provides a sealing action with the surface of the cover member. The spring 15 biases the rod 13 in the upward direction. A cap 16 is threadedly attached to the upper end of the cover member and has an opening through which the upper end of the operating rod projects exteriorly of the hollow chamber. The cap 16 provides a stop against which the rod 13 is biased by the spring 15. By pressing downwardly against the upper end of the operating rod 13, its lower end contacts the connecting member 4 and depresses the lever 11 downwardly so that the valve body 20 pivots relative to the valve seat 21 and opens the outlet through the portion 6 for effecting a venting action from the valve chamber 8.

At its lower end, the main body 1 has a threaded portion 18 on its exterior surface for connecting the air vent to another member. Interiorly of the threaded portion 18, the main body 1 forms an inlet port 17 containing a syphon rod 19 with the lower end of the syphon rod projecting downwardly from the lower end of the inlet port.

In the operation of the air vent described above, initially, when the hollow chamber 3 is filled with a liquid, the float 5 moves upwardly until its connecting member 4 contacts the lower end of the operating rod 13. In this position, there is no displacing force acting on the lever 11 and the valve holder 10 is biased by the spring 9 so that the valve body 20 contacts the valve seat 21 for closing off the opening to the outlet through the portion 6. Since the valve holder is always pressed against the valve seat by the action of the spring 9, even if low pressure conditions exist within the hollow chamber there is no fear that leakage will occur between the valve seat and the valve body and if the valve body is formed of a synthetic rubber, as mentioned above, an improved air-tight closure is attained.

As the amount of air within the hollow chamber increases beyond a predetermined amount, the buoyancy of the float 5 will decrease and it will move downwardly causing the end of the lever passing through the connecting member 4 to move downwardly so that the valve body is pivotted relative to the valve seat which acts as a fulcrum and the outlet through the portion 6 is opened for venting air from the hollow chamber 3 through the valve chamber 8.

With this arrangement of the lever and the pivotting action of the valve holder and valve body relative to the valve seat, the leverage provided is remarkably larger than that obtained in conventional lever-type air vents in which the lever pivots about a pin mounted on the main body of the air vent.

With the valve seat located on the side surface of the hollow chamber, the length of the lever arm from the valve seat 21 to the line of action of the float 5 is at a maximum as compared to conventional air vents of the same size, and the turning moment due to the coil spring is very small. Accordingly, the outlet from the valve can be provided with a larger opening which can be easily opened by a small-type float.

Another advantage of this arrangement is the facility with which the valve member can be detached from the cover member without removing the entire air vent from a pipe so that assembly and disassembly becomes very easy.

With the contacting surface of the valve body against the valve seat being planar and since the lever is not fixed and does not have a guide groove for its end, it is not necessary to align the valve body with the valve seat and its useful lifetime is considerable because there is no partial wear.

As distinguished from comparable conventional lever-type air vents in which the lever is pivotally mounted on a pin which acts as a fulcrum, in the present arrangement there is no problem involved with the lever becoming caught, or being exposed to wear or rust so that its effectiveness is improved.

With the float being formed of metal, if the air vent is used at elevated temperature and pressure, its durability is very good and though the float is small in size, the effect of gravity is sufficient for opening the valve and the shape of the entire air vent can be made very small.

By means of the operating rod 13 on the top of the vent which can be manually displaced, it is possible to depress the float and the lever from the exterior of the vent and open the valve, so that at start-up a large quantity of air can be vented in a short period of time.

By means of the syphon rod located at the inlet port to the hollow chamber in the air vent, the replacement of liquid and air into the hollow chamber is facilitated and the disadvantage of water-lock is eliminated so that the efficiency of the air vent is improved.

As mentioned above, in accordance with the present invention, an air vent construction is provided which can be easily produced at low cost and in small sizes which are available in a wide pressure range without regulation. Further, accurate operation of the air vent is assured and inspection and maintenance on the air vent can be easily carried out.

While specific embodiments of the invention have been shown and described in detail to illustrate the application of the inventive principles, it will be understood that the invention may be embodied otherwise without departing from such principles.

What is claimed is:

1. An air vent comprising a main body portion including first wall means forming a hollow chamber having a top surface, a side surface and a bottom surface, a float displaceably positioned within said hollow chamber, a connecting member secured to said float, a valve member connected to said main body portion and having second wall means forming a valve chamber in communication with said hollow chamber through an opening in the side surface of said hollow chamber, said valve member including a valve seat located within said valve chamber and an outlet passage connected to said valve chamber, a valve body positioned within said valve chamber opposite said valve seat, spring means located within said valve chamber in engagement with said valve body, a lever connected at one end to said valve body within said valve chamber and extending laterally through the opening in the side surface of said hollow chamber and into said hollow chamber where it is in engagement at its opposite end with said connecting member on said float, said second wall means being configured to contain said spring means within said valve chamber with portions of said second wall means abutting said spring means to maintain said spring means in engagement against said valve body to bias said valve body against said valve seat in the direction of closing of said outlet passage.

2. An air vent, as set forth in claim 1, wherein one end of an operating rod extends through said first wall means into said hollow chamber passing through the top surface thereof with the other end of said rod positioned exteriorly of said wall means, and means for retaining said rod within said hollow chamber.

3. An air vent, as set forth in claim 2, including means for biasing said operating rod outwardly from said hollow chamber.

4. An air vent, as set forth in claim 3, wherein the one end of said operating rod located within said hollow chamber is aligned above said connecting member on said float.

5. An air vent, as set forth in claim 4, wherein said first wall means define an opening therethrough extending through the top surface in said hollow chamber, said operating rod extending through the opening in the top surface of said hollow chamber, said means for retaining said rod within the hollow chamber comprises a cap member threadedly connected to said wall means and concentrically disposed about said operating rod, said cap member having an opening through which said operating rod extends exteriorly of said first wall means, and said means for biasing said operating rod outwardly comprises a spring member disposed laterally about said operating rod and bearing at one end against said wall means and at its other end against said operating rod.

6. An air vent, as set forth in claim 1, wherein said lever includes a valve holder fixed to the end of said lever within said valve chamber and said valve holder supporting said valve body.

7. An air vent, as set forth in claim 1, wherein the surface of said valve body directed toward said valve seat is planar.

* * * * *